(12) United States Patent
Tulloch

(10) Patent No.: US 11,919,634 B2
(45) Date of Patent: Mar. 5, 2024

(54) AIRCRAFT WING COMPONENT

(71) Applicant: Airbus Operations Limited, Bristol (GB)

(72) Inventor: William Tulloch, Bristol (GB)

(73) Assignee: Airbus Operations Limited, Bristol (GB)

( * ) Notice: Subject to any disclaimer, the term of this patent is extended or adjusted under 35 U.S.C. 154(b) by 514 days.

(21) Appl. No.: 16/810,265

(22) Filed: Mar. 5, 2020

(65) Prior Publication Data

US 2020/0290721 A1 Sep. 17, 2020

(30) Foreign Application Priority Data

Mar. 13, 2019 (GB) .................................. 1903412.3

(51) Int. Cl.
*B64C 3/36* (2006.01)
*B22D 19/14* (2006.01)
(Continued)

(52) U.S. Cl.
CPC ................ *B64C 3/36* (2013.01); *B22D 19/14* (2013.01); *B22D 27/08* (2013.01); *B64C 3/24* (2013.01); *B64F 5/10* (2017.01); *C22C 1/026* (2013.01); *B32B 15/01* (2013.01); *B32B 2305/028* (2013.01); *Y10T 428/12493* (2015.01)

(58) Field of Classification Search
None
See application file for complete search history.

(56) References Cited

U.S. PATENT DOCUMENTS

| | | | |
|---|---|---|---|
| 3,460,920 A | | 8/1969 | Long et al. |
| 6,085,965 A | * | 7/2000 | Schwartz .............. B32B 15/016 228/205 |

(Continued)

FOREIGN PATENT DOCUMENTS

| | | |
|---|---|---|
| CN | 104 588 617 A | 5/2015 |
| WO | WO 98/33621 A1 | 8/1998 |
| WO | WO 2014/011267 A2 | 1/2014 |

OTHER PUBLICATIONS

European Search Report for Application No. 20160756.1 dated Jul. 27, 2020.
(Continued)

*Primary Examiner* — Xiaobei Wang
(74) *Attorney, Agent, or Firm* — KDW Firm PLLC

(57) ABSTRACT

The trailing edge structure of an aircraft wing is subjected, in use, to high temperature efflux from an aircraft's engines. Such elevated temperatures can detrimentally affect the ultimate tensile strength of the trailing edge. An aircraft wing component includes composite material having a first portion including a metal matrix containing reinforcing material, and a second portion including a metal matrix containing hollow metal ceramic spheres, the second portion being adjacent a surface of the composite material. The provision of two portions, one of which contains reinforcing material and the other comprising hollow spheres means that the composite material has both structural strength and heat shielding qualities where they are needed most in the component. The portion of composite containing the hollow metal ceramic spheres acts as an embedded layer of heat insulation.

15 Claims, 5 Drawing Sheets

(51) Int. Cl.
*B22D 27/08* (2006.01)
*B32B 15/01* (2006.01)
*B64C 3/24* (2006.01)
*B64F 5/10* (2017.01)
*C22C 1/02* (2006.01)

(56) References Cited

U.S. PATENT DOCUMENTS

| | | |
|---|---|---|
| 9,314,996 B1 | 4/2016 | Wedding et al. |
| 2003/0029902 A1 | 2/2003 | Blucher |
| 2003/0129437 A1* | 7/2003 | Kawaguchi ............... B32B 3/20 |
| | | 428/293.1 |
| 2012/0196147 A1* | 8/2012 | Rabiei .................... C22C 38/40 |
| | | 2/2.5 |
| 2016/0375648 A1* | 12/2016 | Adams ................. F41H 5/0492 |
| | | 428/117 |
| 2020/0002014 A1* | 1/2020 | Vassberg ................ F02K 3/068 |

OTHER PUBLICATIONS

British Search Report for Application No. 1903412.3 dated Jul. 25, 2019.

* cited by examiner

AIRCRAFT WING COMPONENT

CROSS-REFERENCE TO RELATED APPLICATION

This application claims priority to GB 1903412.3 filed Mar. 13, 2019, the entire disclosure of which is incorporated by reference herein.

Technical Field

The disclosure herein relates to a component part of an aircraft wing. The disclosure herein further relates to wing assemblies incorporating such a component part, and to methods of manufacturing such components and assemblies.

Background

Developments in aircraft engine technology have resulted in jet engines that are more efficient and powerful, with a high bypass ratio. Such engines tend to be larger in size than traditional jet engines and are more closely integrated with the structure of the adjacent wing assembly.

A problem which may be encountered with such aero-engine developments is that the proximity of the engine to the aircraft wing means that, in use, the trailing edge of the wing is more exposed to the hot, high-pressure gases expelled by the engines. Such engine efflux can reach temperatures of around 1600° C. Wing structures are typically made of aluminum and its alloys; high temperatures have a detrimental effect on the ultimate tensile strength (UTS) of such materials.

FIGS. 1a and 1b are graphs illustrating the effect of a high temperature airflow applied to the surface of a material of thickness 'd' made of a homogenous aluminum alloy. The surface of the material is at d=0. FIG. 1a shows the temperature distribution within a cross-section of the material. The temperature of the material is highest at its surface, and decreases substantially uniformly through the thickness of the material, owing to its homogeneity. FIG. 1b shows the change in UTS of the material. The broken line in FIG. 1b represents the ultimate tensile strength of the material at room temperature. The UTS of the material is less throughout the thickness of the material than it would be at room temperature. This is most significant at the surface of the material that is exposed to high temperatures, where it can be seen that the UTS drops considerably. It will be appreciated that such an effect may detrimentally affect the structural integrity of the trailing edge of the wing assembly, and could limit the service life of the assembly.

Various proposals have been made to protect trailing edge wing structures from the detrimental effects of high temperature efflux. In one proposal, the trailing edge structure includes an epoxy resin composite that is able to withstand elevated temperatures. Even so, such a proposal only protects the wing structure up to temperatures far below those experienced by the trailing edge in use.

In another proposal, a thermally-insulating paste is applied to the trailing edge of the wing. However, such paste layers are unsightly and require regular monitoring and maintenance. If not applied correctly, the paste may change the aerodynamic properties of the wing.

Another proposal is that of manufacturing the trailing edge of the wing from metals or alloys that are better able to operate at high temperatures, such as titanium or so-called superalloys. However, such materials are typically costly to produce and process.

SUMMARY

The disclosure herein provides an aircraft wing component comprising a composite material, a first portion of which comprises a first metal matrix containing reinforcing material and a second portion of which comprises a second metal matrix containing a plurality of hollow metal ceramic spheres, the second portion being adjacent a surface of the component. The provision of two portions, one of which contains reinforcing material and the other comprising hollow spheres means that the component has both structural strength and heat shielding qualities where they are needed most. The portion of composite containing the hollow metal ceramic spheres acts as an embedded layer of heat insulation at the surface of the composite material.

Preferably, the spheres are of substantially the same diameter. This gives uniformity to the temperature response of the second portion of the composite at or near the surface of the material. Alternatively, the spheres may be of a plurality of diameters in a predetermined range, in order to provide better packing of the spheres within the metal matrix.

Preferably, the second, sphere-containing portion comprises less than 50% of the thickness of the material, or even less than 25% of the thickness of the material. By providing reinforcing material over the majority of the thickness of the composite, a material having high tensile strength is formed.

The spheres may be of alumina, which is cheap and lightweight.

Advantageously, the reinforcing material comprises a plurality of fibers, which increases the tensile strength of the composite material. Alternatively, or additionally, the reinforcing material comprises particulate.

The reinforcing material may also include alumina, or be entirely of alumina.

Preferably, the metal matrix of the first portion is of the same material as the metal matrix of the second portion. The, or each, metal matrix may be of aluminum.

The disclosure herein further provides a method of manufacturing a composite material of the disclosure herein, comprising the steps of: laying up spheres and reinforcing material in a mold; introducing liquid metal into the mold; and cooling the mold.

Preferably, the step of laying up includes vibrating the mold so as to distribute the metal ceramic spheres.

The disclosure herein further provides such a component formed as at least part of the trailing edge of an aircraft wing assembly. The component may form part of a control surface for the aircraft.

A wing assembly for an aircraft may comprise a wing main body having a trailing edge and an engine, in which the part of the trailing edge downstream of the engine comprises the component of the disclosure herein.

BRIEF DESCRIPTION OF THE DRAWINGS

The disclosure herein will now be described, by way of example, with reference to the accompanying drawings in which:

FIG. 2b is a perspective view from below of part of the wing of the aircraft of FIG. 2a;

DETAILED DESCRIPTION

Figure 1A:
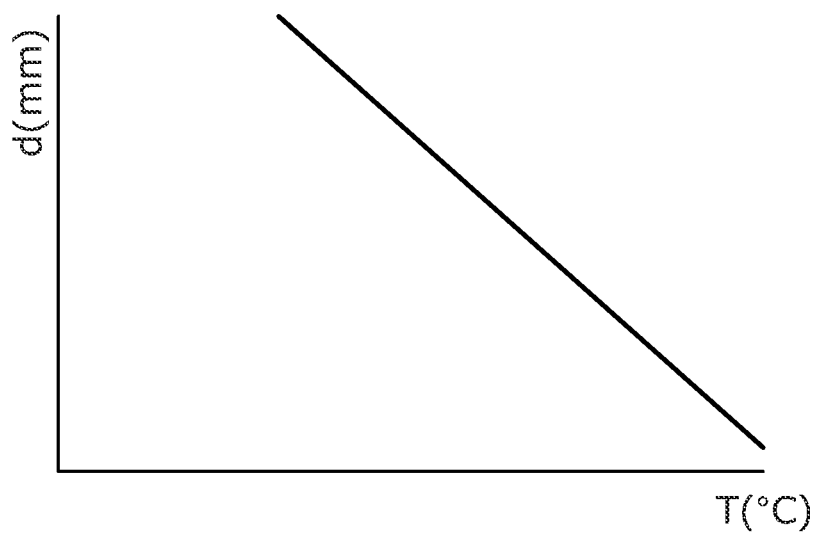
FIG. 1a is a graph showing the temperature profile through the section of a typical conventional aluminum alloy material when exposed to high temperature air.
Figure 1B:
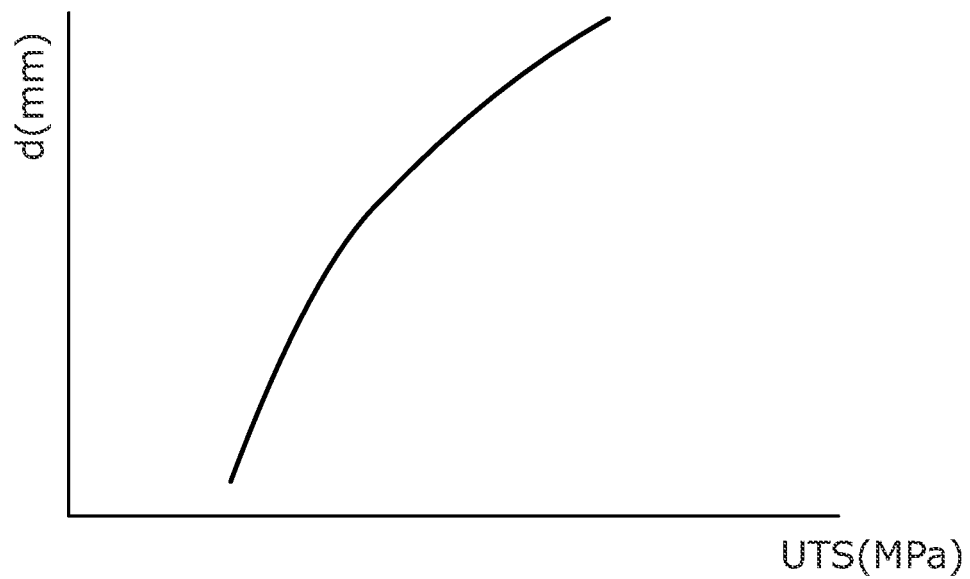
FIG. 1b is a graph showing the UTS of the alloy of FIG. 1a when exposed to high temperature air.
Figure 2A:
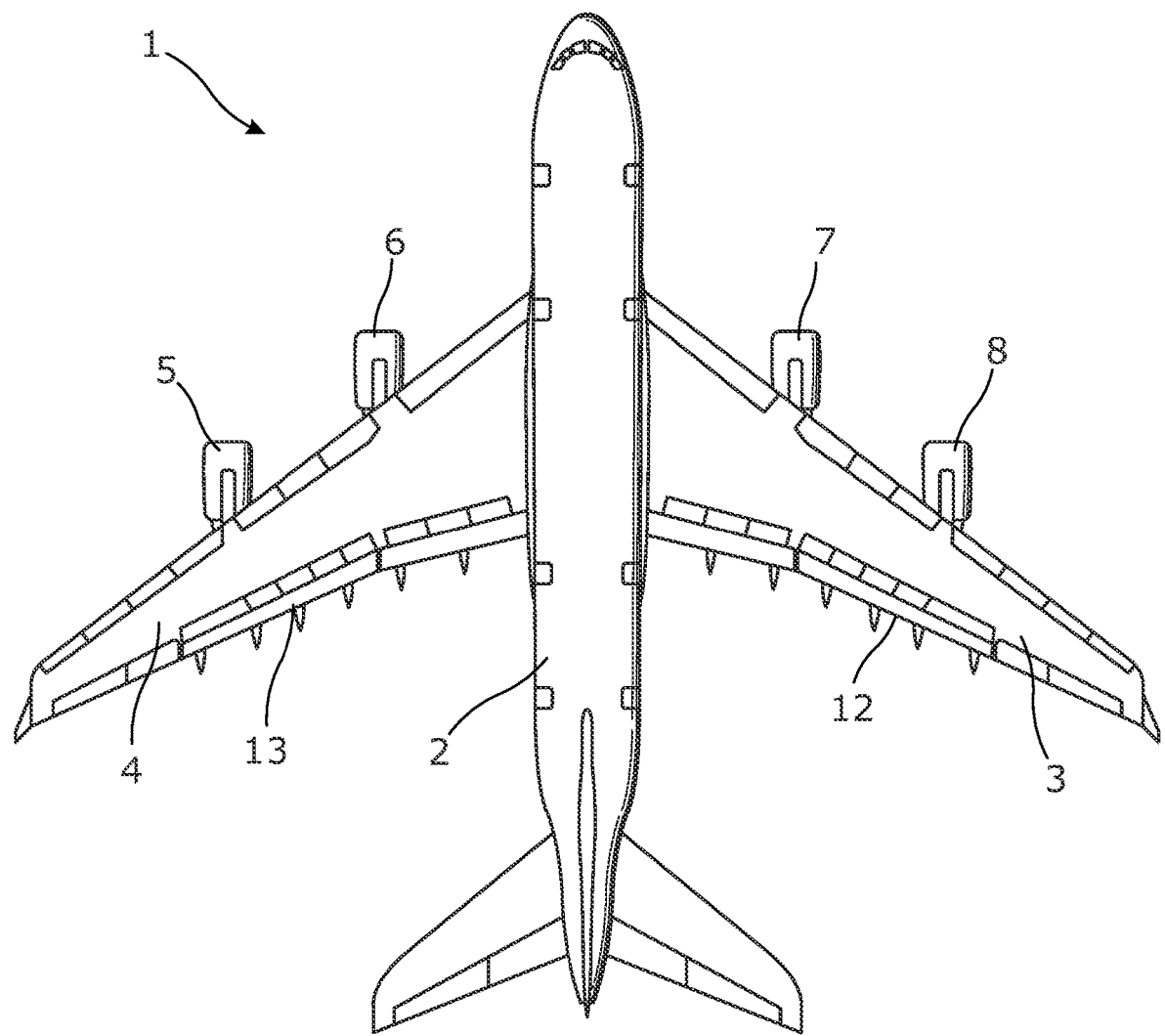
FIG. 2a is a plan view of an aircraft incorporating a composite material constructed according to the disclosure herein.
Figure 2B:
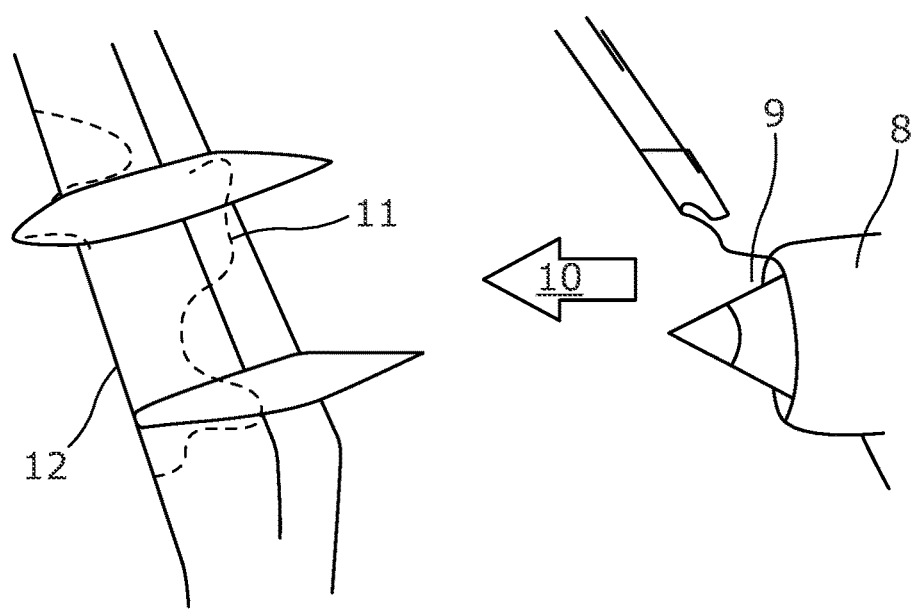

With reference to FIGS. 2a and 2b, a passenger aircraft is shown and indicated generally by the reference numeral 1. The aircraft 1 comprises a fuselage 2 for holding passengers and cargo, a right (starboard) wing 3 and a left (port) wing 4. A plurality of engines are provided, housed in nacelles 5, 6, 7, 8 on the wings 3, 4. The engines are arranged, in use, to take in large volumes of air, which is heated and compressed, mixed with jet fuel and combusted. The air subsequently expelled from the exhaust nozzles of the engines generates thrust that causes the aircraft to move. The expelled air, or efflux, is very hot and can be as much as 1600° C. at its core. The parts of the aircraft wing immediately downstream of the exhaust nozzles, particularly on the underside of the wing, have to be able to withstand such elevated temperatures.

FIG. 2b shows part of the underside of wing 3. The exhaust 9 of the engine housed in nacelle 8 is shown in this drawing. The large arrow 10 indicates the direction of hot efflux from the exhaust nozzle. The region delimited by the broken line 11 experiences greatest exposure to the high temperature airflow. In accordance with the disclosure herein, at least part of the trailing edges 12, 13 of the wings 3, 4 are made of a composite material which is shown in section in FIG. 3.

In order to function effectively as the trailing edge of a wing, the material has to provide structural strength as well as be able to deal with the high temperature efflux from the engines' nozzles. To this end, two portions or regions 14, 15 of metal matrix composite (MMC) material are provided. The first region 14 comprises the major portion of the material's thickness and comprises a metal matrix 16 having a reinforcing material embedded within it. In this embodiment, the reinforcing material comprises a plurality of layer of long filaments 17 of alumina. This region 14 of MMC material provides the necessary structural strength that the trailing edge of an aircraft wing requires in order to be able to withstand the forces that the wing experiences during flight whilst maintaining its precise aerodynamic contours.

In accordance with the disclosure herein, the second region 15 comprises a metal matrix 18 containing a plurality of hollow metal ceramic spheres 19 embedded within it. In this embodiment, the hollow spheres 19 are of substantially constant diameter and are made of alumina. The region 15 of composite containing metal ceramic spheres is arranged to be at the surface 20 of the material, so that it is more directly exposed to the hot engine efflux. In both first and second regions 14, 15, the metal matrix is aluminum, which is both lightweight and relatively cheap to produce. The region 15 acts as a heat shield, which insulates the structure of the trailing edge against the detrimental effects of the high temperature efflux.

Figure 4A:
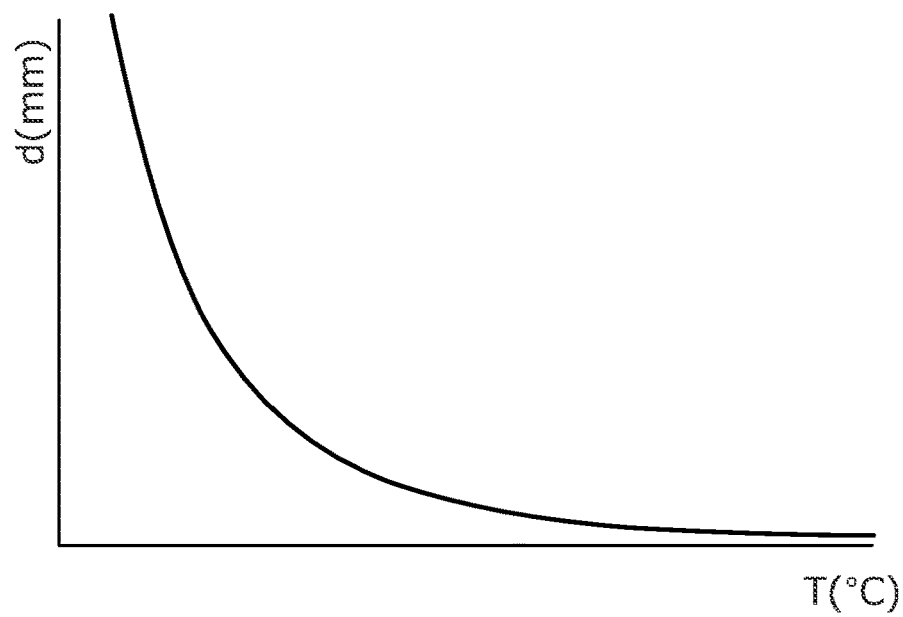
FIG. 4a is a graph showing the temperature profile through a section of the material of FIG. 3 when exposed to high temperature air.
Figure 4B:
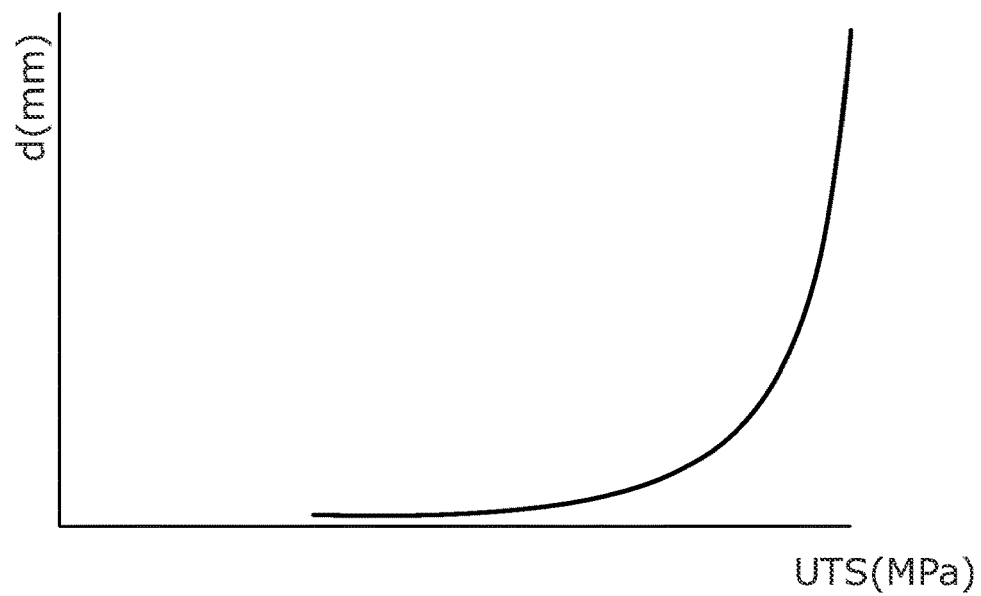
FIG. 4b is a graph showing the UTS of the material of FIG. 3 when exposed to high temperature air.

FIGS. 4a and 4b are graphs illustrating the effect of a high temperature airflow applied to the surface 20 of the composite material of the disclosure herein. The surface 20 of the material is at approximately d=0. FIG. 4a shows the temperature distribution within a cross-section of the material. The temperature of the material is highest at its surface, and drops hyperbolically through the thickness of the material, owing to the region 15 acting as an embedded layer of heat insulation that shields the region 14 from the high temperature air. FIG. 4b shows the change in UTS of the material. The UTS of the material is low across region 15, but is much higher across region 14 than was achievable hitherto. The embedded insulation of region 15 serves to protect the major portion 14 of the composite from the detrimental effects of heating so that the trailing edge of the wing assembly retains its structural integrity, thereby improving its service life.

Figure 5:
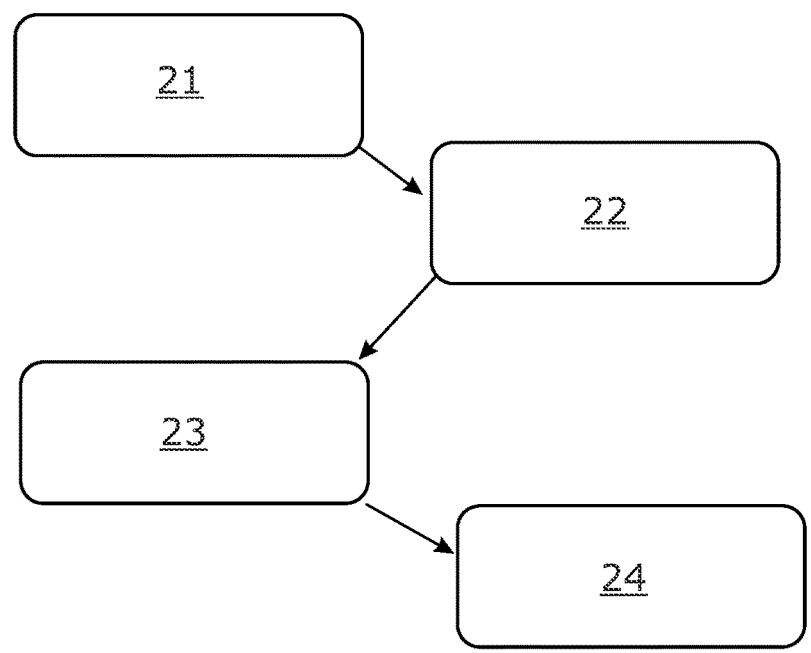
FIG. 5 is a flow chart of a typical process for manufacturing the material of FIG. 3.
Figure 3:
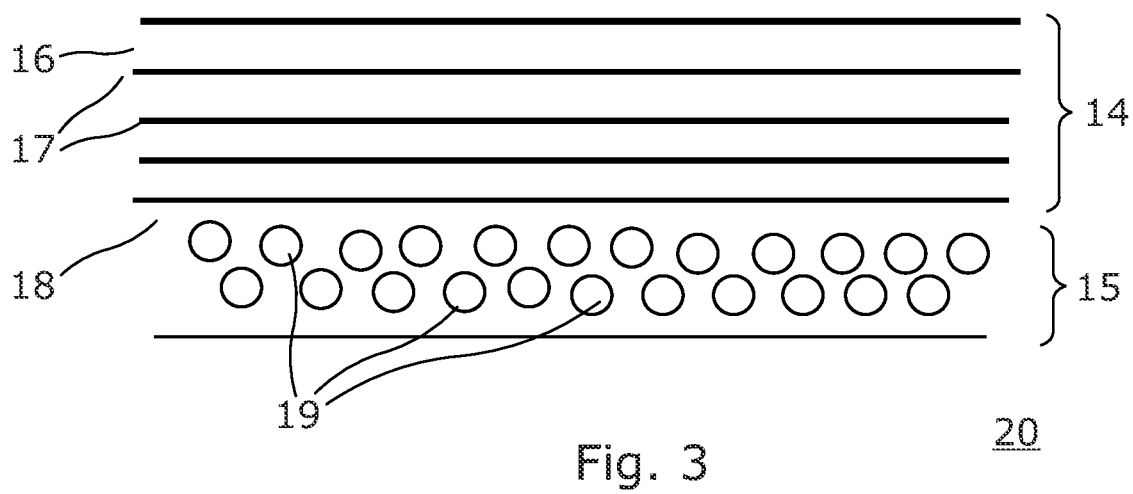
FIG. 3 is a sectional view of part of the material forming part of the wing of FIGS. 2a and 2b.

The material of FIG. 3 may be manufactured by, for example a casting method, the steps of which are represented schematically in FIG. 5.

In one embodiment of a casting method according to the disclosure herein, the first step comprises "laying up" of the hollow metal ceramic spheres and reinforcing material. Firstly, the spheres are placed inside the mold (step 21). The hollow spheres may be arranged inside the mold, such as through vibrating, to pack the spheres into a best attainable close-packed density. Once the spheres are packed in the mold, the reinforcing materials are added to the mold (step 22). This may be done by simply laying fibers within the mold, or else by winding fibers around one of more support structures, which may be formed in the casting mold itself.

The next step 23 in the manufacturing process is that of introducing the metal matrix material. One way in which this can be done is by pouring liquid metal into the mold. In this embodiment, the mold incorporating the spheres and reinforcing material is first pre-heated. Preferably, the pre-heat temperature is approximately equal to the casting temperature of the matrix-forming liquid metal in order to prevent premature solidification of the matrix before complete filling of the mold.

The matrix-forming liquid metal is cast into the mold in such a manner as to fill the voids around the hollow spheres and reinforcing material while avoiding disturbance of the spheres and reinforcing material within the mold. In some embodiments, it may be useful to use screens, pegs, or other similar means, for maintaining the arrangement of the spheres and reinforcing material within the mold. In addition to gravity casting, the mold may be subject to pressure differentials during the cast process. For example, the mold may be pressurised or held under vacuum.

Once the matrix-forming liquid metal has been satisfactorily cast into the mold, the liquid metal is solidified (step 24) to form a solid metal matrix around the hollow spheres and reinforcing material. Such solidification is generally through cooling of the mold, which can be through atmospheric cooling or through more controlled cooling methods.

Figure 6A:
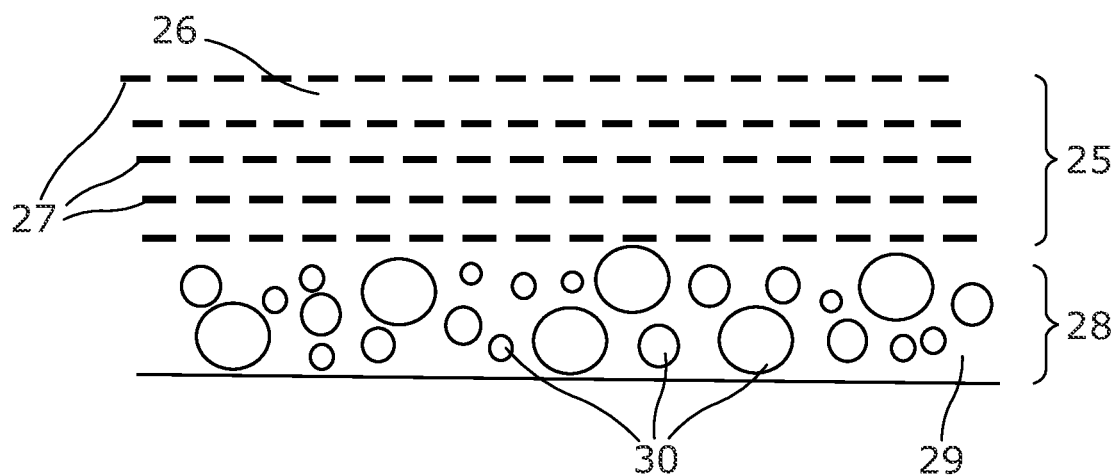
FIG. 6a is a sectional view of material constructed according to an alternative embodiment of the disclosure herein.
Figure 6B:
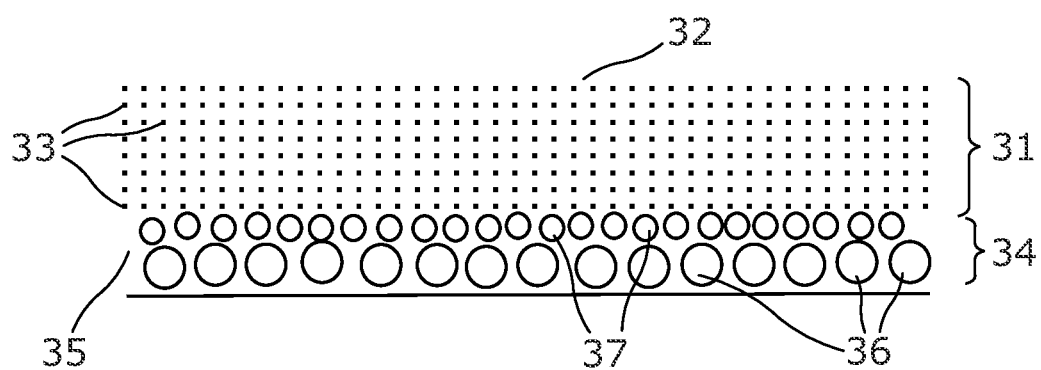
FIG. 6b is a sectional view of a material constructed according to another alternative embodiment of the disclosure herein.

FIGS. 6a and 6b show alternative composite materials constructed according to the disclosure herein. In FIG. 6a, the first region 25 comprises a metal matrix 26 containing reinforcing elements in the form of a plurality of layers of fibers 27 that are shorter in length than those in the embodiment of FIG. 3. Shorter fibers tend to be less brittle than long fibers. The second region 28 comprises a metal matrix 29 having embedded hollow metal ceramic spheres 30 which, in this embodiment, have a variety of diameters over a predetermined range of values. Such a selection of spheres may pack into a denser arrangement than an arrangement in which the spheres are all of one diameter.

In the embodiment of FIG. 6b, the first region 31 comprises a metal matrix 32 containing reinforcing elements in the form of particulate material 33, which can be considered to be the limit of short fiber length. The advantage of using particulate reinforcement is that the resulting first region 31 of the composite will be isotropic, having the same mechanical properties in all directions. In this embodiment, the second region 34 comprises a metal matrix 35 containing spheres of two different diameters 36, 37; the spheres of larger diameter 36 are arranged in a layer closest to the surface of the material and the spheres of smaller diameter 37 are arranged between the first layer of spheres 36 and the reinforcing particulate region 31. Such an arrangement provides a transition between the thermally insulating portion of the composite and the reinforced portion of the composite.

Of course, any combination of reinforcing material and spheres may be embedded in the metal matrix to form the wing component constructed according to the disclosure herein. The composite material may be customized so as to have different zones in accordance with the desired physical characteristics of the material. For example, a zone that requires structural strength but is not exposed to extremes of temperature would comprise more reinforcing material in the matrix, whereas a zone that is exposed to the highest temperatures would contain more metal ceramic spheres. The portion of the composite that comprises the sphere-containing material has been shown in the drawings to form a relatively small proportion of the overall thickness of the composite, but of course this could be varied and customized in dependence on the required properties of the resulting composite material. The spheres may comprise up to 50% of the respective portion of composite material by weight. Similarly, the reinforcing material may comprise up to 50% of the respective portion of the composite material by weight.

Further variations may be made without departing from the scope of the disclosure herein. For example, the reinforcing elements may be selected from any one, or a combination of, wires, fibers, tapes, threads and particles. The reinforcing elements may, for example, comprise aluminum oxide (alumina), silica, boron, galvanic-coated carbon, or any other high strength fibers or particulate.

The spheres may be of any diameter in the range of micrometers to millimeters. They may all be of substantially the same diameter or a selection of a plurality of diameters. The spheres may be of one material, such as alumina or silica carbide, or a plurality of different materials in the same composition. The spheres may be coated to enable easier integration with the metal matrix.

The matrix material is a metallic material, such as aluminum, titanium, or any other suitable material. Preferably the matrix material is relatively lightweight, low cost, and easy to process. The metal matrix may be the same throughout the material, or different materials may be used in different zones, depending on the required characteristics of the finished product.

The composite material may be formed by other suitable processes known to the skilled person, such as powder metallurgy, squeeze casting or diffusion bonding.

The wing component of the disclosure herein may comprise the trailing edge of the wing itself, in whole or in part, and/or may comprise the underside of the wing downstream of the engine. The wing component may comprise a flap, aileron or other control surface of an aircraft that would be exposed in use to high temperature airflow.

The disclosure herein may be utilized in other wing structures requiring structural integrity at elevated temperatures due to the proximity of heat-generating components, for example, or due to aerodynamic friction. The disclosure herein may be used in order to provide a shield to extremes of cold temperature. Further variations and applications will be apparent to the skilled person.

The invention claimed is:

1. An aircraft wing component comprising a composite material, wherein:
    a first layer of the composite material comprises a metal matrix containing a reinforcing material;
    a second layer of the composite material comprises a metal matrix containing a plurality of hollow spheres comprising alumina; and
    the second layer is adjacent to an external surface of the composite material in a thickness direction of the aircraft wing component, such that the first layer is spaced apart in the thickness direction from the external surface of the composite material by the second layer.

2. The component of claim 1, wherein the spheres have substantially similar diameters.

3. The component of claim 1, wherein each of the spheres has one of a plurality of diameters in a predetermined range.

4. The component of claim 1, wherein the second layer comprises less than 50% of a thickness of the composite material.

5. The component of claim 1, wherein the second layer comprises less than 25% of a thickness of the composite material.

6. The component of claim 1, wherein the reinforcing material comprises at least one of a plurality of fibers and particulate.

7. The component of claim 1, wherein the reinforcing material includes alumina.

8. The component of claim 1, wherein the metal matrix of the first layer portion is of a same material as the metal matrix of the second layer.

9. The component of claim 1, wherein the metal matrix of at least one of the first and second layers comprises aluminum.

10. The component of claim 1, wherein the aircraft wing component comprises at least part of a trailing edge of a wing.

11. The component of claim 1, wherein the aircraft wing component comprises an aircraft control surface.

12. A method of manufacturing an aircraft wing component, the aircraft wing component comprising a composite material, wherein:
    a first layer of the composite material comprises a metal matrix containing reinforcing material;
    a second layer of the composite material comprises a metal matrix containing a plurality of hollow spheres comprising alumina; and
    wherein the second layer portion is adjacent to an external surface of the composite material, such that the first layer portion is spaced apart from the external surface of the composite material by the second layer;
the method comprising:
    laying up the spheres and the reinforcing material in a mold;
    introducing a metal into the mold; and
    solidifying the liquid metal into a solid.

13. The method of claim 12, comprising, when laying up the spheres and the reinforcing material in the mold, vibrating the mold to distribute the spheres within the mold.

14. A wing assembly comprising:
- a wing main body;
- an engine; and
- an aircraft wing component arranged downstream of the engine, the aircraft wing component comprising a composite material, wherein:
  - a first layer of the composite material comprises a metal matrix containing reinforcing material; and
  - a second layer of the composite material comprises a metal matrix containing a plurality of hollow spheres comprising alumina;
  - wherein the second layer is adjacent to an external surface of the composite material in a thickness direction of the aircraft wing component, such that the first layer is spaced apart in the thickness direction from the external surface of the composite material by the second layer.

15. An aircraft incorporating the wing assembly of claim 14.

\* \* \* \* \*